July 16, 1957  O. MUELLER  2,799,340
HOLE PUNCHING DEVICE AND METHOD
Filed Feb. 19, 1952  5 Sheets-Sheet 1

INVENTOR.
Otto Mueller.
BY
Harness, Dickey & Pierce
ATTORNEYS

INVENTOR.
Otto Mueller.
BY
Harness, Dickey & Pierce
ATTORNEYS.

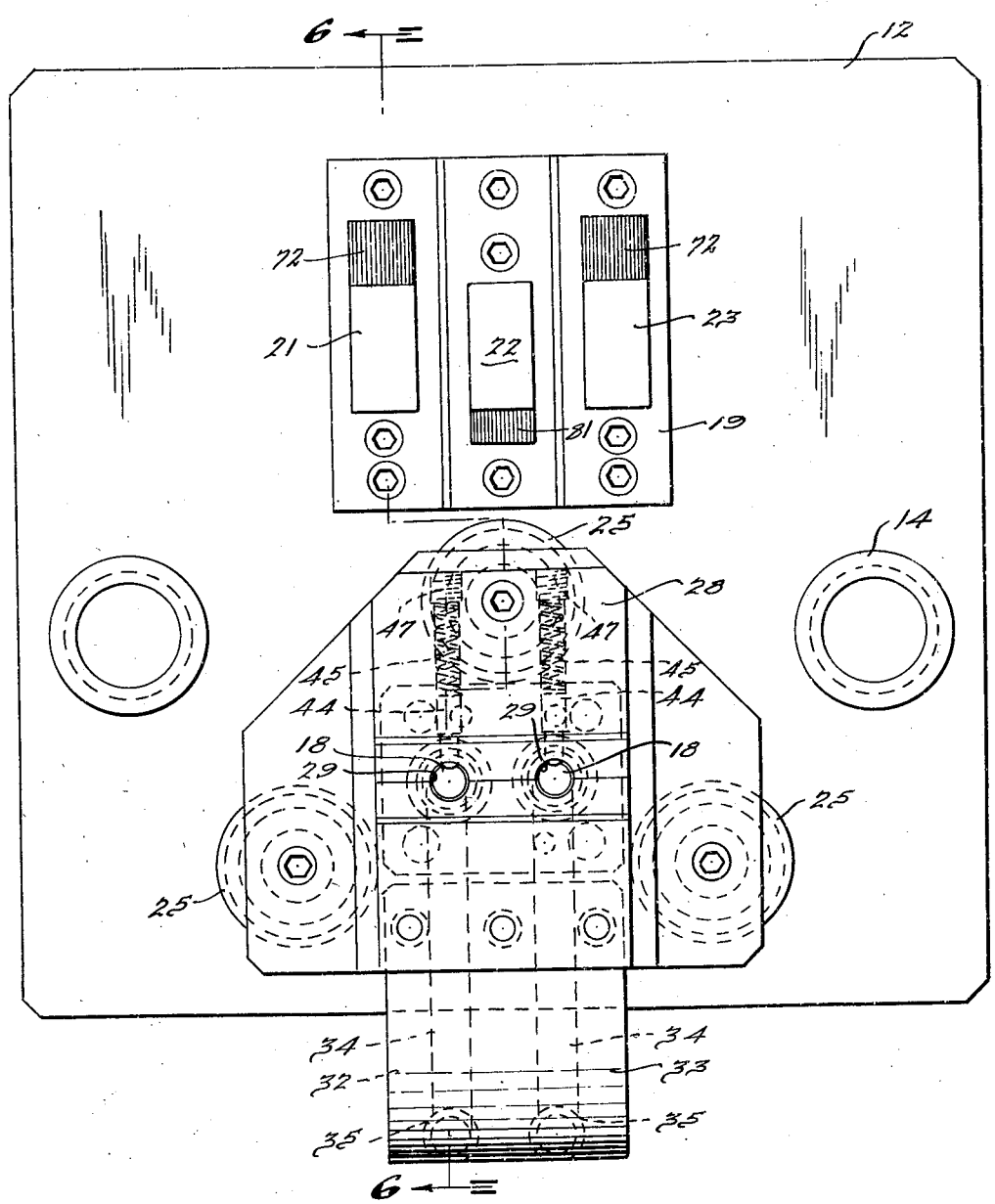

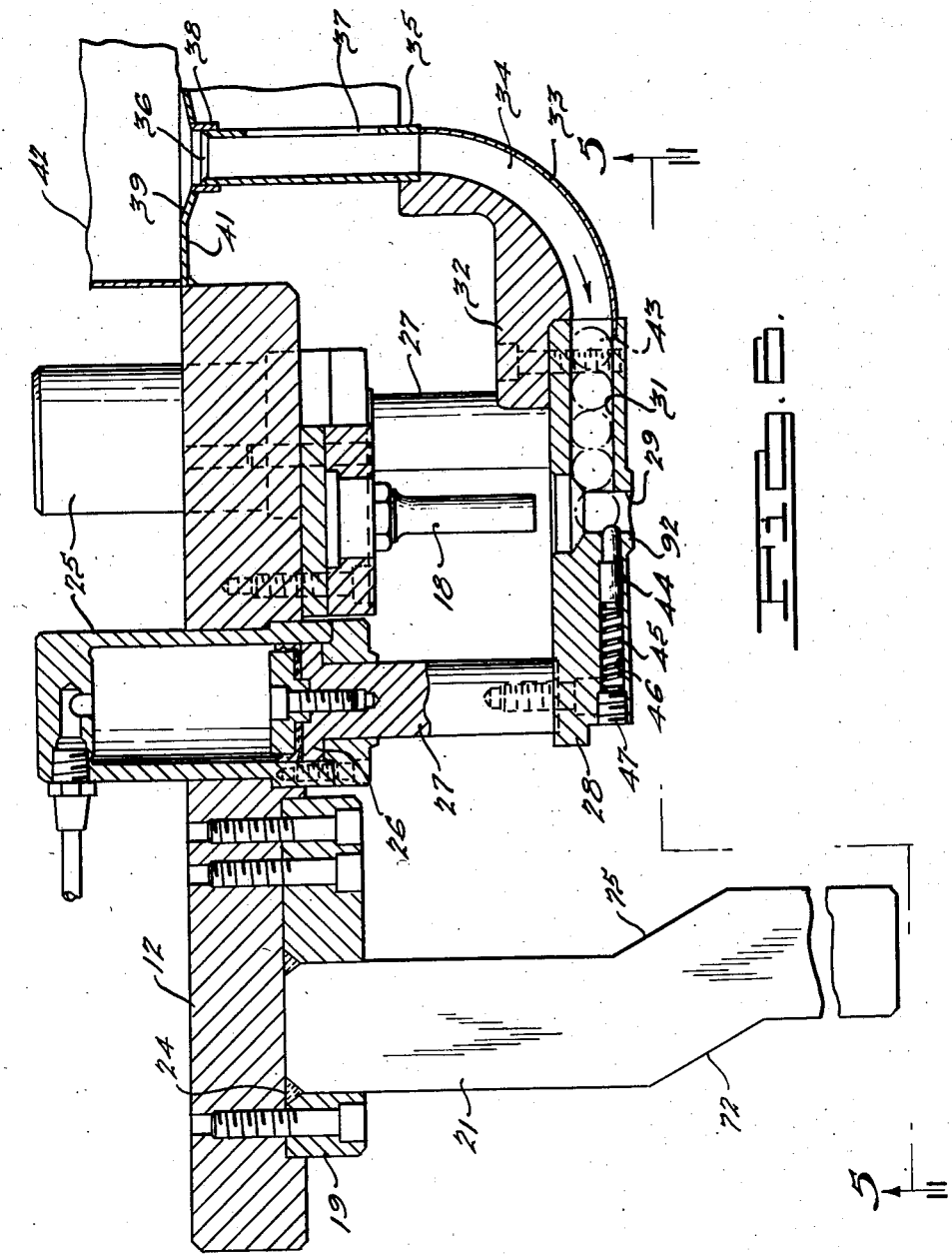

United States Patent Office

2,799,340
Patented July 16, 1957

2,799,340

HOLE PUNCHING DEVICE AND METHOD

Otto Mueller, Dearborn, Mich., assignor to Masemo Corporation, Detroit, Mich., a corporation of Michigan Application February 19, 1952, Serial No. 272,359

8 Claims. (Cl. 164—86)

This invention relates to a punching device and to the method of punching apertures in a thick workpiece.

Difficulty has always been experienced when attempting to punch holes in thick material. Punching operations heretofore have usually been limited to workpieces substantially less than one inch in thickness with a punch having a diameter less than the thickness of the material to be punched. When heavier materials and larger holes were required, it was necessary to employ a drilling operation which was substantially more expensive, requiring a greater amount of time and tool replacement than a punching operation if it could be utilized.

The present invention pertains to a device and method by which large holes may be punched in heavy materials with the ease and rapidity acquired in punching small holes. This method embodies the heating of the workpiece to a high temperature and rapidly forcing the ball end of a spindle through the material by the downstroke of a press in the same manner as in the conventional punching operation.

In the example illustrating the present method, a pair of holes of slightly less than one inch in diameter is punched in a block of alloyed steel substantially two inches thick. For this purpose a pair of spindles having semispherical recesses in the ends is positioned a predetermined distance apart when taking into consideration that contraction will occur to the metal of the block, which thereby shifts the center lines of the holes punched to the required spacing. A fixture securely positions the metal workpiece in the device and a pair of balls is positioned over the center of the hole to be punched, aligned with the spindles and the female die elements. Upon the downstroke of the press, both balls are pushed through the metal, carrying the metal collected ahead of the ball outwardly through the female die element, from which the ball and punched metal drop into a cooling medium which separates the ball from the metal. The spindles are immediately withdrawn from the holes during the upstroke of the press, there being no seizure occurring between the spindles and the inner wall of the holes as the diameter of the spindles is less than the diameter of the balls. In such an arrangement, a holddown pad is not required to hold the workpiece while the spindles are being withdrawn therefrom. This rapid withdrawal of the spindles from the punched holes prevents the spindles from becoming hot and the balls are prevented from being heated by being immediately immersed in the cooling medium in which the balls and punched metal drop. The metal accumulated ahead of the ball was found to separate therefrom and it was only necessary to separate the metal from the balls in a simple screening operation to have the balls available for a subsequent punching operation.

Accordingly, the main objects of the invention are: to provide a device and method for punching large holes through thick hard metal; to perform a punching operation by the use of a ball which is forced through a heated workpiece by a spindle which is of less diameter than the ball; to provide a method of performing a punching operation which embodies the heating of a thick workpiece of hard metal to a high temperature and forcing a ball through the metal by the pressure of the working stroke of a press, and, in general, to provide a device and method for punching holes which is simple, positive and economical.

Other objects and features of novelty of the invention will be specifically pointed out or will become apparent when referring, for a better understanding of the invention, to the following description taken in conjunction with the accompanying drawings, wherein:

Fig. 5 is a sectional view of the structure illustrated in Fig. 6, taken on the line 5—5 thereof;

Fig. 6 is a sectional view of the structure illustrated in Fig. 5, taken on the line 6—6 thereof;

Fig. 8 is a view in elevation of a tool of the present invention, showing a modification thereof.

Figure 1:
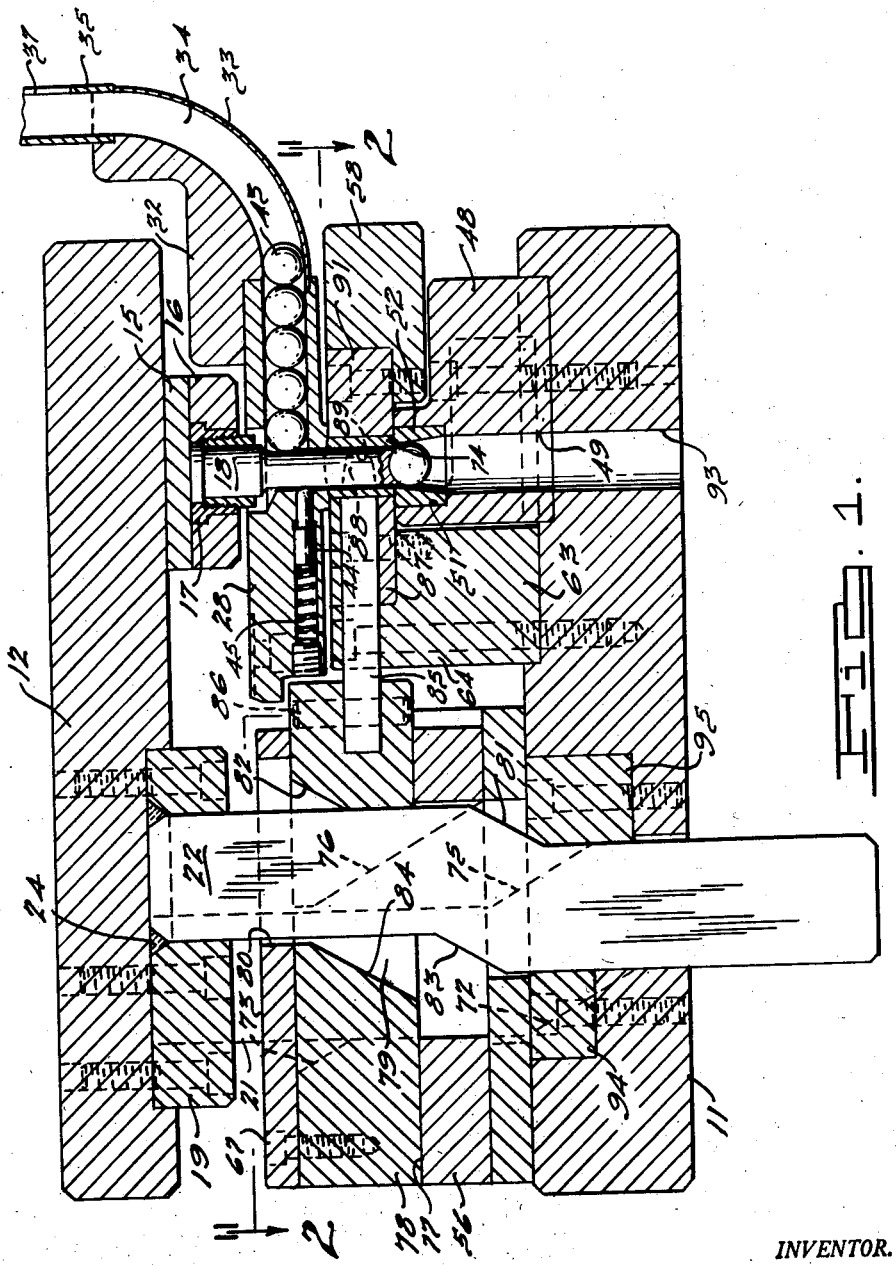
Figure 1 is a vertical sectional view of a device which is capable of practicing the method of the present invention, taken on line 1—1 of Fig. 2.
Figure 2:
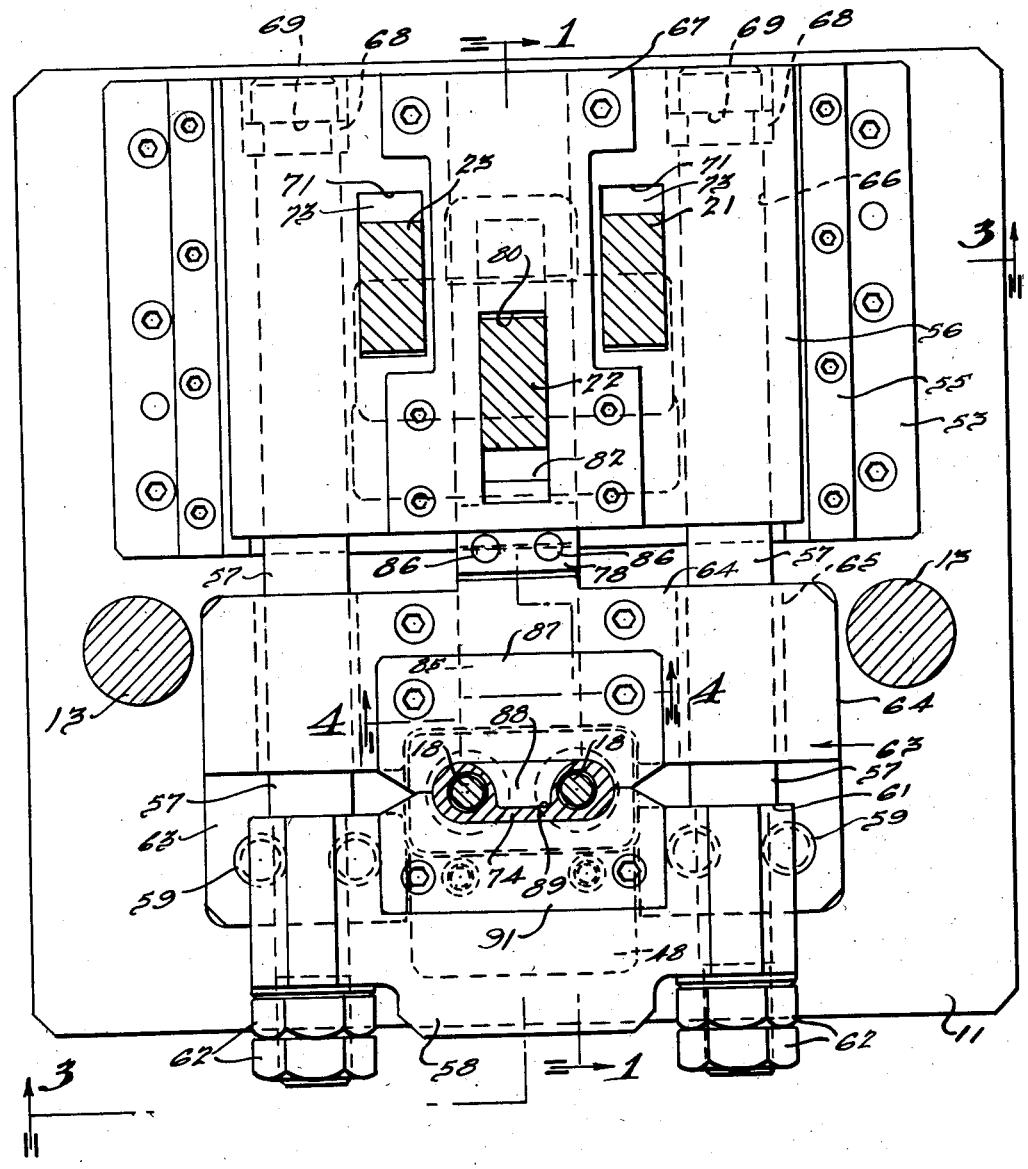
Fig. 2 is a sectional view of the structure illustrated in Fig. 1, taken on the line 2—2 thereof.
Figure 3:
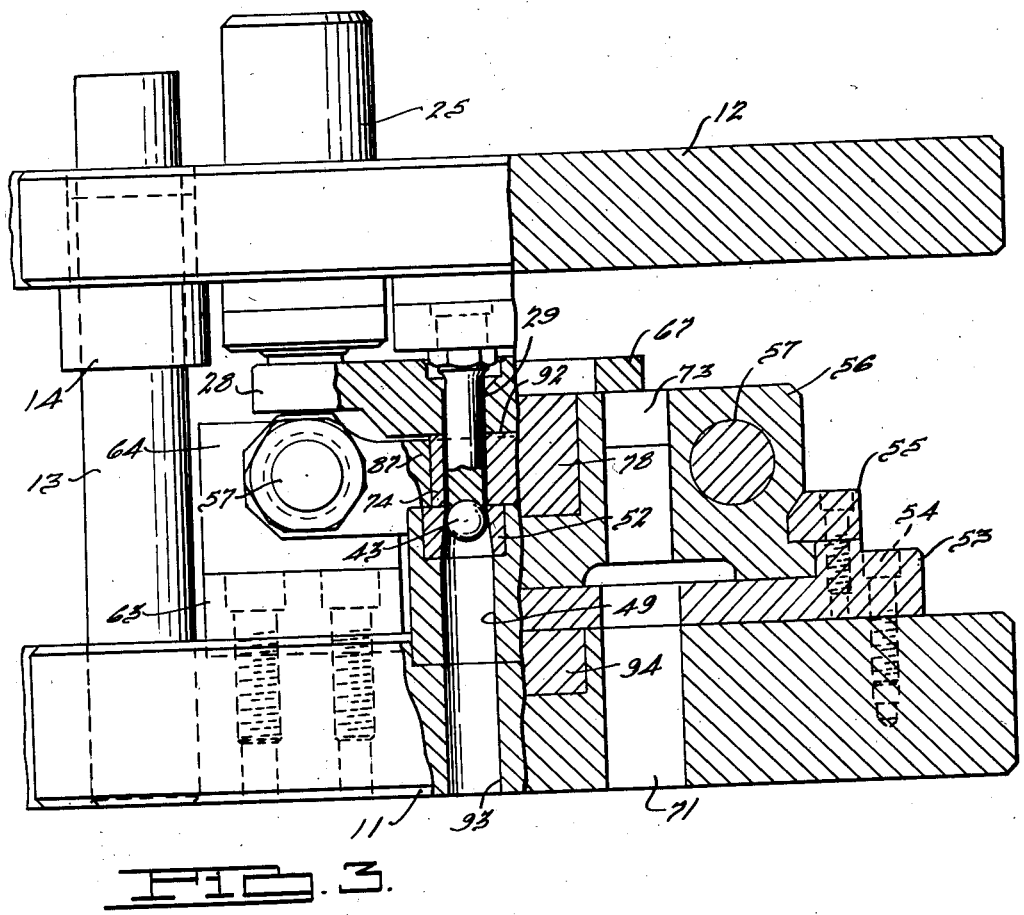
Fig. 3 is a view in side elevation of the structure illustrated in Fig. 1, with parts in section, taken on the line 3—3 of Fig. 2.

The device of the present invention may take various forms, but by way of example the one herein illustrated comprises a bottom plate 11 and a top plate 12 which are to be supported upon the bed and pressure plate of a press. A pair of cylindrical guide rods 13 is fixed to the bottom plate 11 upon which bushings 14 of bearing material, which are fixed in the top plate 12, are guided. The top plate on its under side has a pair of supporting plates 15 and 16 for a pair of punch retainers 17 which are illustrated, described and claimed in the O. Mueller application, Serial No. 131,571, filed December 7, 1949. The retainers 17 support the punch spindles 18 in accurately aligned relation to each other. It is to be understood that one or a plurality of punch spindles may be employed in the assembly. The two spindles 18 are specifically referred to herein since two holes are to be punched in the workpiece which is illustrated by way of example. A supporting plate 19 is also secured to the under face of the top plate 12 employed for supporting three cam bars 21, 22 and 23, which are secured to the plate 19 by welding at 24.

As illustrated more specifically in Fig. 6, the top plate 12 supports three work cylinders 25, each having a piston 26 therein from which a piston rod 27 extends. The three piston rods 27 support a plate 28 in stable relation relative to the top plate 12, the plate having apertures 29 therein through which the pair of punch spindles 18 extends. The aperture 29 communicates with an aperture 31 disposed at right angles thereto. The aperture 31 communicates with an upwardly arched slot 34 in a plate 32 which is enclosed by an arcuate strip of metal 33. A tube 35 extends vertically from the plate 32 continuing the passageway 31 to the upper end of the tube which is chamfered at 36. A slot 37 is provided in the side wall of the tube through which the interior thereof is visible. The tube operates in a sleeve 38 which extends downwardly from a well portion 39 in the bottom 41 of a ball-retaining hopper 42. The hopper is large enough to have a pair of sleeves 38 extend therefrom so that a pair of the sleeves 35 may operate therein.

Each of the apertures 29 in the plate 28 communicates with the passageway 31 in which hardened balls 43 pass when delivered to the apertures 29. Each of the apertures 29 has a plunger 44 disposed adjacent thereto with the end projecting therein to prevent a ball in the passageway 31 from passing downwardly through the aperture 29. The plunger is urged forwardly by a spring 45 which is retained within the plunger aperture 46 by a threaded plug 47. The bed plate 11 is provided with a die-carrying block 48 having a pair of apertures 49 aligned with the punch spindles 18 which are shouldered at 51 at the top for receiving the female die elements 52.

Between the base plate 11 and top plate 12, mechanism is provided for clamping the workpiece and holding it in accurate position for the punching operation. This embodies a plate 53 which is secured to the base plate 11 by screws 54 and which has a pair of ways 55 for engaging and accurately guiding a slide 56. The slide carries a pair of cylindrical guide bars 57 which are secured to a plate 58 which is moved with the bars and slide. The guide bars 57 are shouldered at 61, the adjacent ends being threaded to receive a pair of clamping nuts 62 which secure the plate 58 on the ends of the bars. A plate 63 is fixed to the base plate 11 by the screws 59 and is provided with an upstanding portion 64 which is aligned with the movable plate 58. Apertures 65 are provided in the upstanding portion 64 of plate 63, through which the guide bars 57 are movable. The opposite end of the guide bars to that containing the nuts 62 is press-fitted within apertures 66 in the slide 56 secured against movement in the direction in which a force is applied by the split collars 68 which engage apertures 69 near the end of the guide bars 57.

A pair of cam slots 71 is provided in the slide 56 through which the cam bars 21 and 23 extend, having rearward cam surfaces 72 which engage the cam surfaces 73 of the slots 71 to move the slide 56 to carry the plate 58 toward the workpiece 74 upon the downward movement of the top plate 12. Upon the upward movement of the top plate 12, forward cam surfaces 75 on the cam bars engage cam surfaces 76 of the slots 71 and move the slide 56 in the opposite direction for moving the plate 58 away from the workpiece 74.

The slide 56 has a channel 77 therein in which a slide 78 is retained by a plate 67. The plate 67 has an aperture 80 therein aligned with an aperture 79 in the slide 78 through which the cam bar 22 extends. The forward face of the cam bar carries a cam 81 which engages a cam surface 82 to move the slide 78 forwardly when the top plate 12 is moved downwardly. A rear cam 83 on the cam bar 22 engages a cam surface 84 on the slide 78 upon the upward movement of the top plate 12 for moving the slide 78 to retracted position. A clamping bar 85 is secured in a slot in the end of the slide 78 by a pair of pins 86. The clamping bar 85 extends through the raised portion 64 of the plate 63 and is guided in a work clamping plate 87 to have the forward end 88 extend into a recess 89 in the workpiece between the areas in which the apertures are to be punched.

A work clamping plate 91 is carried by the movable plate 58, the plates 87 and 91 being so shaped as to encompass the side and end surfaces of the work when the bottom thereof rests upon the female die elements 52 and the upper portion of the work is engaged by the projecting end 92 on the plate 28. In this manner, the work is completely confined and accurately retained by the clamping plates 87, 91, as well as the clamping bar 85.

The work is heated before being placed between the clamping plates 87 and 91 substantially to a red heat and the press is operated to move the top plate 12 downwardly. The rear cam faces 72 of the cam bars 21 and 23 immediately operate the slide 56 in a direction away from the work, to thereby draw the plate 58 and the clamping plate 91 toward the work to clamp the work between the plates 91 and 87. Only thereafter is the slide 78 advanced toward the work, forcing the end 88 of the clamping bar 85 into the recess 89 in the work as the slide 78 is moved toward the work. After the clamping operation, the punch spindles 18 engage the balls 43 which are prevented from passing through the apertures 29 by the ends of the plungers 44 and force the balls downwardly through the work. The slugs pushed from the work and the balls will drop through the aperture 49 in the plate 48 and the aperture 93 in the bottom plate 11 into a cooling medium in a suitable container where they are immediately cooled. In this manner the balls are prevented from being heated by the hot metal which immediately separates from the balls when dropped into the cooling medium.

It will be noted that the punch spindles 18 have a smaller diameter than the diameter of the ball so that no effort is required for withdrawing the spindles from the holes. In the example herein illustrated, the ball has a diameter of $31/32''$, while the punch spindle has a diameter of $29/32''$. Sufficient clearance is thereby provided to prevent any seizure between the spindle and work so that the spindles are free to move from the punched hole upon the upstroke of the press. During this upward movement, the slide 78 is moved in a direction away from the work and the slide 56 is moved in a direction toward the work, moving the plate 58 and the clamping plate 91 out of contact with the work which may be removed so that a new heated piece of work may be placed in punching position.

During the initial downward movement of the press, the end 92 of the plate 28 engages the top of the work. During the further downward movement of the press, the plate 28 is maintained stationary, applying a predetermined pressure to the workpiece due to the movement of the pistons 26 within the cylinders 25. The pistons 26 force the fluid in the cylinders outwardly past a regulator valve, to thereby control the pressure applied to the work. Upon the upward movement of the press, the fluid entering the cylinders 25 holds the plate 28 against the work until near the end of the upward stroke, at which time the plate 28 moves upwardly with the pistons 26. During this movement of the plate 28, the tubes 35 move upwardly and downwardly through the sleeves 38 on the hopper 42, and in this manner pick up the balls 43 and retain the passageway 31 filled at all times. That the tube is filled may be checked by an operator glancing through the slot 37 in the tubes 35.

Upon the relative movement between the plate 28 and the top plate 12, the punch spindles 18 move out of the apertures 29, as illustrated in Fig. 6, permitting the next adjacent balls in the passageways 31 to drop into position in the apertures 29 and be retained in punching position by the ends of the plungers 44. After the work has been placed in position, the cycle is repeated upon the next stroke of the press in the manner as above set forth.

It will be noted that the lower ends of the cam bars 21, 22 and 23 are disposed in aligned relation, as illustrated in Fig. 1, and that a pair of guide plates 94 and 95 is secured on opposite sides of the slots in the bottom plate 11 through which the ends project. The plates accurately guide the lower ends of the cam bars relative to the opposite ends which are rigidly secured to the top plate 12.

Figure 7:
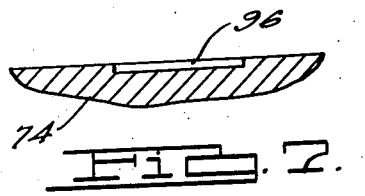
Fig. 7 is a broken sectional view of a workpiece showing a forged recess located on the center of the hole to be punched.
Figure 4:
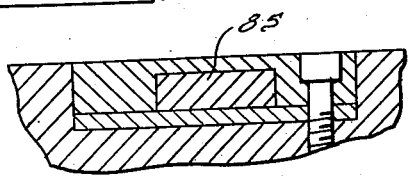
Fig. 4 is an enlarged sectional view of the structure illustrated in Fig. 2, taken on the line 4—4 thereof.

In Fig. 7 a workpiece 74 is illustrated, having a recess 96 therein at the point where a hole is to be punched which was formed during the time the workpiece 74 was forged. This recess provides a sharp edge at the top of the hole and prevents the corners from being rounded off as the punching operation progresses. When a chamfered hole is desired, the rounding off of the end in which the ball is pushed has the advantage of having less metal to be removed during the chamfering operation.

The ball could have a short shank thereon which is to be engaged by the punch spindle, but such an arrangement would not be as advantageous as that using the round ball because of the difficulty in accurately locating the shank end in alignment with the punch spindle. The machining of a ball end 97 directly on the smaller diameter punch spindle 98, as illustrated in Fig. 8, would have the advantage of sizing the hole when withdrawn therethrough or the punch spindle could be released so that it would drop therethrough in the same manner as the ball having the short shank thereon. Since cooling and shrinking would occur to the metal of the work, a pressure plate would be required to hold down the work when the ball is withdrawn therefrom. Such an operation would produce the sizing of the hole and reworking the grain structure of the hole wall in the direction opposite to that from which the metal was forced. The hole could be coined to size in a subsequent operation in the device herein illustrated. In any of the constructions, substantial clearance is provided between the punch spindle and the wall of the hole by having the spindle of less diameter than the ball, as pointed out hereinabove.

When a plurality of sets of spindles and die elements are employed to produce a plurality of holes, they are spaced on centers slightly further apart to provide compensation for the shrinkage which will occur upon the cooling of the work. The present work element is a forging which is returned to the heating furnace after the forging operation and reheated to approximately forging temperature and placed in the present device to have the punching operation performed thereon. The centers of the punched holes in the illustrated work element are 2½" apart, and it was necessary to space the spindles a greater distance apart to have the centers of the holes located on the 2½" center distance after the cooling of the work occurred. Thus, if a rise in temperature of 1500° occurs to the work element, the spacing of the spindles will be increased substantially .041" to obtain the 2½" desired spacing of the punched holes in the work element upon cooling.

What is claimed is:

1. A punching device including, in combination, a female die element, a hardened ball, and a spindle for pushing the ball through the solid wall of the workpiece and a solid slug through the die element, said spindle having a socket for centering said ball and being of less diameter than the diameter of the ball so that after the ball passes through and drops from the die element the spindle may be retracted from the punched hole with a minimum of effort.

2. A punching device including, in combination, a female die element, a hardened ball, a spindle of less diameter than the ball having a socket on the ball engaging end for receiving and aligning the ball with the die element through which a slug is forced by the ball from the solid wall of a workpiece, a fixture for receiving and clamping the work relative to the die element, means for supporting the spindle in alignment with the die element, means for feeding the ball to a position above the work in alignment with the spindle, and means for advancing the spindle for forcing the ball through the workpiece and the slug cut therefrom and ball from the die element.

3. A punching device including, in combination, a pair of spaced female die elements each having an aperture, said apertures being spaced apart a greater distance than the sum of the radii of the apertures, a pair of spindles of less diameter than the aperture in the female die elements disposed in aligned relation therewith, and means for supporting a pair of hardened balls substantially the size of said aperture above the work element in alignment with the die elements and spindles, the latter of which push the balls through the solid wall of the work element when moved toward the die elements through which the punched solid slugs are moved ahead of the balls, the spacing of said die elements and spindle being such as to compensate for the shrinkage which occurs to the work element when cooled after having the holes punched therein when hot so that the punched apertures will have the centers accurately spaced apart.

4. In a punching device, a support for a female die element, a female die element on said support, a second support movable relative to said first support, a spindle, means on said second support for supporting said spindle in aligned relation to said female die element, clamping means for receiving and clamping a heated work element in accurate relation to said die element and spindle, and means for supporting a ball above the workpiece in alignment with said spindle, said ball being forced downwardly through the solid wall of the work element to move a solid slug through said die element when the second support is moved toward the first support, said spindle having a socket on the end for receiving said ball and having a diameter less than the diameter of the ball so as to be free to be withdrawn from the work element.

5. In a punching device, a support for a female die element, a female die element on said support, a second support movable relative to said first support, a spindle, means on said second support for supporting said spindle in aligned relation to said female die element, clamping means for receiving and clamping a heated work element in accurate relation to said die element and spindle, and a ball end on said spindle, said spindle being of less diameter than the diameter of the ball end thereof so that the only engagement with the wall of the hole being punched occurs on the line of the maximum diameter of the ball end, which hole is further worked to a desired diameter after the partial cooling of the work element upon withdrawing the ball end through the hole upon the separation movement of the two supporting elements.

6. The method of punching holes in a work element which includes the steps, of forcing a ball through the solid wall of a heated work element to remove a slug therefrom and form an aperture, and cooling said slug and ball and separating the slug from the ball.

7. The method of punching a plurality of holes in a work element which is heated to a high temperature which includes the steps, of confining the hot work element, of pushing a ball through the heated work element for punching a hole therein to form an aperture as the ball moves a slug from the workpiece which may adhere to the ball, and of immersing the ball and slug in a cooling medium to cool the ball and separate the slug therefrom.

8. The method of punching holes in a work element which is heated to high temperature which includes the steps, of confining the heated work element relative to a female die element, of forcing a ball end of a spindle which is of less diameter than the ball end through the hot metal of the work element to punch a hole therein, and of reworking the hole so punched by the engagement of the major diameter of the ball end with the wall of the workpiece upon withdrawing the spindle and ball end therethrough after the wall has shrunk an amount due to cooling.

References Cited in the file of this patent

UNITED STATES PATENTS

| | | |
|---|---|---|
| 50,754 | Weimer | Oct. 31, 1865 |
| 322,930 | Hammond | July 28, 1885 |
| 612,001 | Jenkins | Oct. 4, 1898 |
| 915,659 | Clark | Mar. 16, 1909 |
| 1,082,910 | Rockwell | Dec. 30, 1913 |
| 1,302,532 | Donaldson | May 6, 1919 |
| 1,321,096 | Geer | Nov. 11, 1919 |
| 1,360,558 | Mattsson | Nov. 30, 1920 |
| 1,467,166 | Jones | Sept. 4, 1923 |
| 1,673,244 | Hires et al. | June 12, 1928 |
| 1,729,843 | Reich | Oct. 1, 1929 |

(Other references on following page)

UNITED STATES PATENTS

| | | |
|---|---|---|
| 1,859,026 | Crosby | May 17, 1932 |
| 2,420,992 | Wilson | May 20, 1947 |
| 2,424,087 | Focke et al. | July 15, 1947 |
| 2,537,867 | Tichy | Jan. 9, 1951 |

FOREIGN PATENTS

| | | |
|---|---|---|
| 10,436 | Great Britain | Apr. 28, 1914 |
| 415,233 | Great Britain | Aug. 23, 1934 |